Sept. 13, 1955     M. J. VERAIN     2,717,874
PROCEDURE AND APPARATUS FOR THE STERILIZATION OF WATER
Filed May 12, 1951     2 Sheets-Sheet 1

MARCEL JULES VERAIN
INVENTOR
By Richardson, Davis and Nordon
his ATT'YS.

Sept. 13, 1955 M. J. VERAIN 2,717,874
PROCEDURE AND APPARATUS FOR THE STERILIZATION OF WATER
Filed May 12, 1951 2 Sheets-Sheet 2

MARCEL JULES VERAIN
INVENTOR
By Richardson, Davis and Nordon
his ATT'Ys.

United States Patent Office

2,717,874
Patented Sept. 13, 1955

2,717,874

PROCEDURE AND APPARATUS FOR THE STERILIZATION OF WATER

Marcel Jules Verain, Nancy, France

Application May 12, 1951, Serial No. 225,933

Claims priority, application France November 16, 1950

10 Claims. (Cl. 210—28)

The invention is concerned with the sterilization of water and rests upon the discovery of certain effects of ultra sounds on water, and especially on diluted aqueous solutions of chlorine.

It is known to sterilize water by means of chlorine or chlorine-forming compounds. However, the efficiency of chlorine as a sterilizing agent cannot be complete unless certain concentrations are reached, at which the presence of chlorine is detected by its taste and smell; the use of water treated in this way for drinking or cooking and even for certain domestic and other uses gives rise to serious criticisms.

When chlorine is dissolved in water, it reacts in accordance with the equilibrium equations:

$$Cl_2 + H_2O \rightarrow ClOH + HCl$$
$$ClOH \rightarrow O + HCl$$

The speeds of these reactions are very slow, which explains why the smell and the taste of chlorine persist for a very long time.

Now, applicant discovered that these speeds can be accelerated, to such an extent that free chlorine disappears in a few seconds in a diluted aqueous solution of chlorine, by submitting this solution to the action of ultra sounds.

The object of the invention is, therefore, a process for the sterilization of water which consists in treating water with a high proportion of chlorine, sufficient to destroy the germs existing in the water, and then to submit the water to ultra sounds. A proportion of at least 1 mg. per litre is in general suitable for the chlorination step of the process.

The effect of ultra sounds is not confined to eliminating the free chlorine remaining in the water after the treatment with chlorine.

Ultra sounds have, in fact, a germicide action of their own, and this by a double process:

(a) A process of mechanical destruction, known per se, as described by P. Grabar and R. Prudhomme (Compt. Rendus Acad. des Sciences, vol. 226 (1948) p. 1821–1823).

(b) A process of oxidation of water, by which oxidizing substances are substituted for chlorine and contribute in the destruction of the pre-existing germs and in the preservation of the sterilized water against outside contamination.

This latter effect was, to the best of applicant's knowledge, heretofore unknown. Experiments carried out on chemically neutral pure water proved that ultra sounds impart an oxidizing power to water and reduce the pH.

The oxidizing power of water treated with ultra sounds can be proved by the following experiment.

In order to exhibit the variation of the oxidizing power of water, applicant uses the property of ortho-tolidine of giving in the presence of oxidizing products a characteristic yellow coloration. By this method a quantitative photometric dosage can be made. Applicant used the Spekker photometer with two photo-electric cells in opposition, fitted with violet filters showing a maximum transmission at 430 millimicrons wave length. The thickness of the layer in the vessel was 20 mm., which enabled quantitative measurements to be made. Dosage curves giving the correspondence between the measured optical density and the oxidizing power were obtained by means of Scott's chromate-bichromate standards (Standard Methods for the Examination of Water and Sewage, 9th edition, 1946). Applicant was therefore able to establish the relation between the oxidizing power developed and the equivalent quantity of chlorine.

As it was further necessary to cause variation of one single factor at a time among the factors capable of having an influence on the appearance of the oxidizing power, applicant made the following series of tests:

(a) Aerated distilled water was given a series of pH values and submitted to ultra sounds, thus giving the oxidizing power in relation to the pH and the time of action of the ultra sounds.

(b) Variations of the oxidizing power in relation to the gaseous phase above the liquid, and to the dissolved gases, were studied.

(c) Variations of the pH caused by ultra sounds in relation to the nature of the gaseous phase present was also experimented.

As regards the variations of the oxidizing power in relation to the pH of water, experimental results clearly show that, for a given time of action, the oxidizing power developed grows as the pH decreases. When the pH decreases from 9.40 to 7.30, the oxidizing power doubles for the same time of action (three minutes).

This shows that, in order to develope these oxidizing properties, it is preferable to operate at a pH not above 7.50.

As regards the nature of the overlying gaseous phase, the best results are obtained with air enriched with nitrogen. For practical purposes, however, atmospheric air gives satisfactory results. Nevertheless, it is preferable to cause air to bubble through the ultra-sounded liquid, as the oxidizing power developed is thereby increased.

In all cases, a lowering of the pH of water subjected to ultra sounds has been constantly observed except when the overlying atmosphere was constituted by hydrogen.

In the case of an atmosphere of air, the pH of a pure distilled water was lowered from 5.90 to 4.30 under the action of ultra sounds.

When the water has been chlorinated, hydrochloric acid is formed under the action of ultra sounds, but, in most cases, the hydrochloric acid so produced (which would be produced at any rate without the application of ultra sounds) can be disregarded. The small quantity of HCl produced (about 1 milligramme per milligramme of chlorine) is neutralized by the bicarbonates in solution in natural water, and $CO_2$ is liberated.

The explanation of these phenomena is still uncertain, but the following is considered as probable.

Water is naturally dissociated in accordance with the equilibrium reactions:

1. $$H_2O \rightleftharpoons H^+ + OH^-$$

Concentrations follow the law:

$$[OH^-][H^+] = \text{constant } (10^{-14})$$

and

2. $$OH^- \rightleftharpoons H^+ + O^{--}$$

The constant of equilibrium of (1) is already so small that the second equilibrium in practice does not come into play.

Now, under the action of the ultra sounds, these two equilibriums are apparently completely altered, and shifted towards the right in the equations. Therefore, equilibrium (2), which is always negligible in usual practice, takes a relative importance and the concentration in ions O− − explains the oxidizing properties.

On the other hand, the products of dissociation, activated by the ultra sounds, will possibly combine together to yield oxidizing bodies ($H_2O_2$ type).

Applicant tried to check whether the oxidizing grouping was due to bodies of the ozone type and, for this purpose, he compared ozonized water and ultra-sounded water with the Beckmann spectrophotometer. He verified a maximum absorption of 3600 A° for the ultra-sounded water, which maximum does not exist in the case of ozone. Therefore, the oxidizing body is apparently not ozone.

These phenomena of oxidization can also find at least a partial explanation in the action of ultra sounds on the gases dissolved in water.

It seems that these gases, such as nitrogen, are activated and acquire electric charges. Hence they become probably capable of combining with the ions O− − arising from the dissociation of water, to yield nitrogen oxides, which would explain the surprising discovery that the maximum oxidizing effect is obtained in value and stability, when water is surmounted by an atmosphere composed of 50% oxygen and 50% nitrogen.

Comparable results, but not quite so good, are obtained with an atmosphere of air or nitrogen. With an oxygen atmosphere the paradoxical result is noticed that the oxidizing power developed by the ultra sounds is very poor and quickly reaches a maximum. With an atmosphere of hydrogen or carbon dioxide, the oxidizing power developed by the ultra sounds is nil.

Whatever may be the scientific explanation of the above phenomena, the fact remains that ultra-sounded water surmounted by air acquires an oxidizing and germicide power. In theory, therefore, ultra sounds alone could be used for sterilizing water by both mechanical and chemical effects of ultra sounds on the destruction of pathogenic germs. However, such a procedure would not be economical under present conditions; commercially, there is a definite advantage in sterilizing water with an excess of chlorine and then subjecting water to the ultra sounds to ensure the elimination of chlorine, to mechanically destroy any germs which may have resisted the action of chlorine, and to substitute for chlorine oxidizing bodies which will keep sterilized water from further contamination.

Another advantage of ultra sounds is that they mechanically destroy any agglomerates or foreign bodies in suspension in water, in which germs may be enclosed and protected, and thus expose the latter more efficiently to the chemical action of chlorine or the oxidizing bodies which are afterwards substituted for chlorine.

The invention is also concerned with a plant for carrying out this process, the essential characteristic of this plant being to embody somewhere on the path the water to be sterilized a capacity associated with a generator of ultra sounds.

The form of this capacity is not optional. It must, in fact, be so devised that the whole body of water contained therein shall be subjected to ultra sounds and that dead zones, where water would escape the action of ultra sounds, are eliminated. Otherwise, free chlorine would persist and the mechanical and chemical effects of the ultra sounds on any residual germs would be impaired.

The invention will be more clearly understood from the following description with reference to the accompanying drawing in which.

Figure 1:
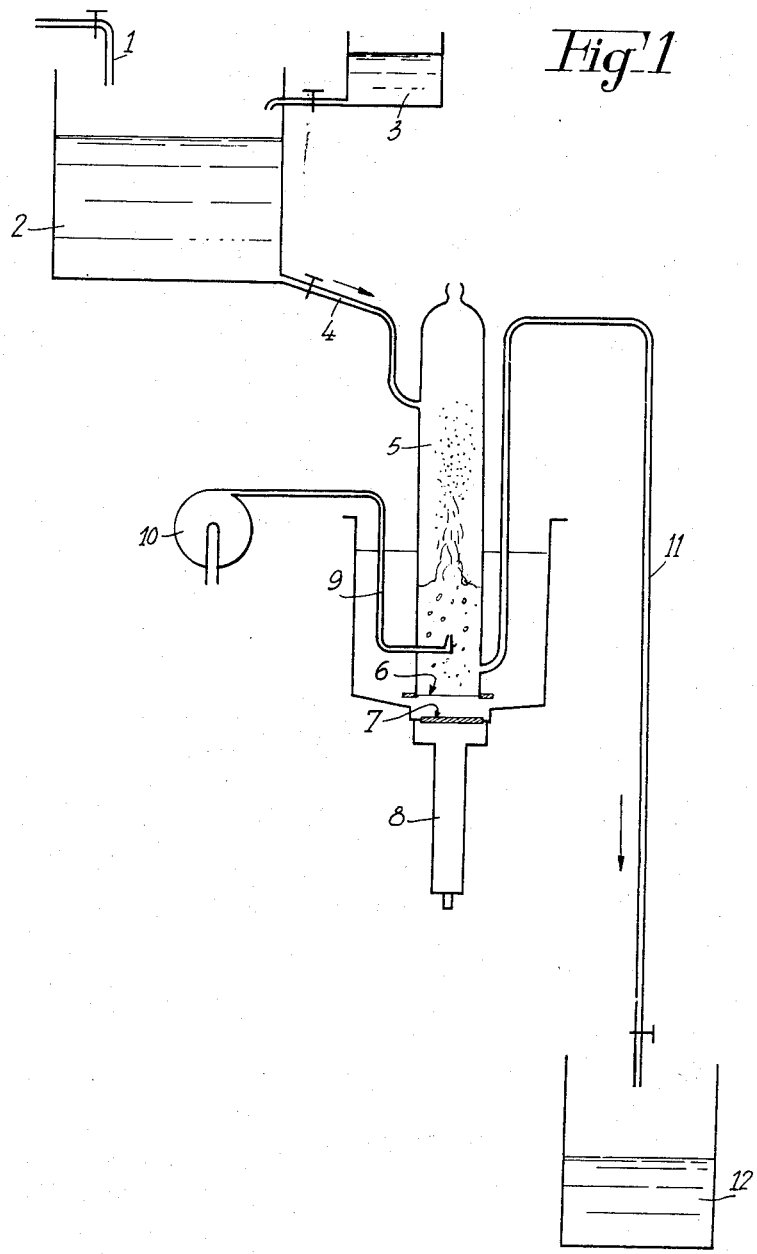
Fig. 1 is a diagram of a plant for the continuous sterilization of water.

Referring to Fig. 1, 1 indicates a pipe for supplying water to be sterilized, which flows into a chlorination tank 2, which is supplied in a suitable proportion, controlled by conventional methods, with a saturated solution of chlorine, from a chlorine tank 3. The water is thus superchlorinated i. e. chlorinated by an amount largely in excess of that necessary for rendering the particular water being treated potable. The superchlorinated water flows through a tube 4, either continuously or in successive batches, into an ultra-sounding bell or capacity 5, which is open at the top to the atmosphere and which is closed at the bottom by a thin metallic membrane 6, overlying an ultra sound generator, the piezo-electric quartz crystal of which is shown diagrammatically at 7, while 8 indicates the high tension current supply line.

The apparatus may comprise an air bubbling tube 9 extending through a lateral wall of the bell and connected with a ventilator 10.

The ultra sounded water passes through a tube 11 into a storage tank 12 where the sterilized water accumulates.

Figure 2:
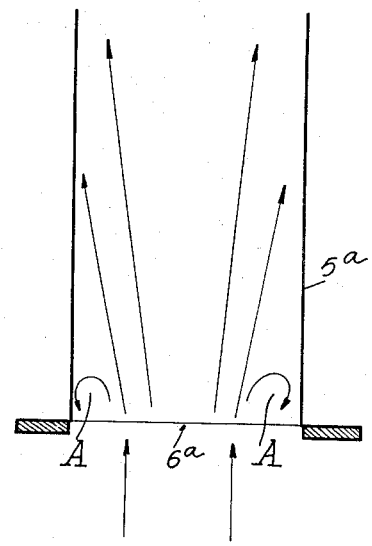
Fig. 2 shows the existence of dead zones in an ultra-sounding capacity which is badly designed.
Figure 3:
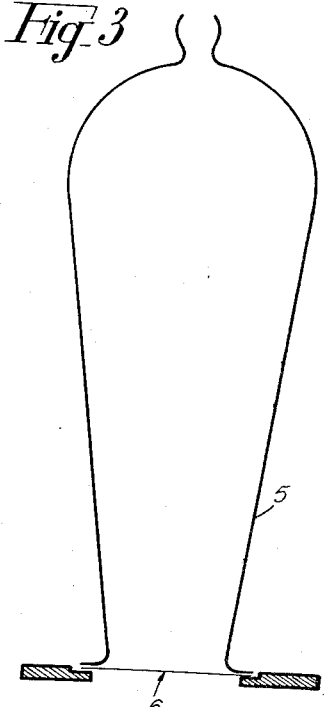
Fig. 3 shows the form to be given to this capacity in order to avoid such dead zones and Fig. 4 shows the evolution of the oxidizing power in ultra-sounded chlorinated water.

As shown in Fig. 2, if the wall 5a and the metallic membrane 6a of the bell were badly designed, dead zones "A" would exist, which should be avoided by giving the bell 5 and the membrane 6 the shapes shown in Fig. 3.

The ultra sounds produced by the crystal 7 are propagated through membrane 6 and the mass of water contained in bell 5. The bulk of water is subjected to pressure variations of high frequency and, if the frequency and the energy supplied are sufficient, gush of water similar to a geyser is produced at the water/air interface, together with a violent mixing and the formation of a stable mist.

These mechanical effects, as stated above, are accompanied by chemical effects, viz. the elimination of chlorine and the appearance of other oxidants. The precise dosage of traces of chlorine in the ultra-sounded water gives rise to serious difficulties, because the colorimetric dosages of chlorine rest on the oxidizing properties thereof. As the action of ultra sounds on water gives rise to oxidizing products, it becomes impossible to identify the latter by conventional methods. Applicant mastered the difficulty as follows:

1. Chlorinated water was acidified and the evolving gas thoroughly eliminated and passed into a washer containing a solution of ortho-tolidine. Progress of the discoloration permitted a person to be informed about the elimination of chlorine in water.

2. Non-chlorinated ultra-sounded water was treated under the same conditions. Applicant could not trace any discoloration of the reagent. There was, therefore, no separation from the water of the oxidizing bodies generated by the ultra sounds.

3. Chlorinated water was ultra-sounded and, by the above-mentioned means, applicant determined the variations of the residual chlorine content, and could thus determine the duration of the ultra-sounding necessary to eliminate all trace of chlorine. This time depends of course upon the initial dose of chlorine. For an initial chlorine concentration of 3 mg. of chlorine per litre, the concentration of residual chlorine was less than 0.1 mg. per litre after one minute.

If the initial chlorine concentration is less, this time can be reduced. For example if the initial chlorine concentration is 1.5 mg. per litre, the concentration of residual chlorine is 0.05 mg. per litre after about 15 seconds (see Example 1 below).

For a reliable control, it is necessary to allow two minutes to elapse between the moment when the ultra-sounding is stopped and the moment when the determination is made of the residual gaseous chlorine.

Figure 4:
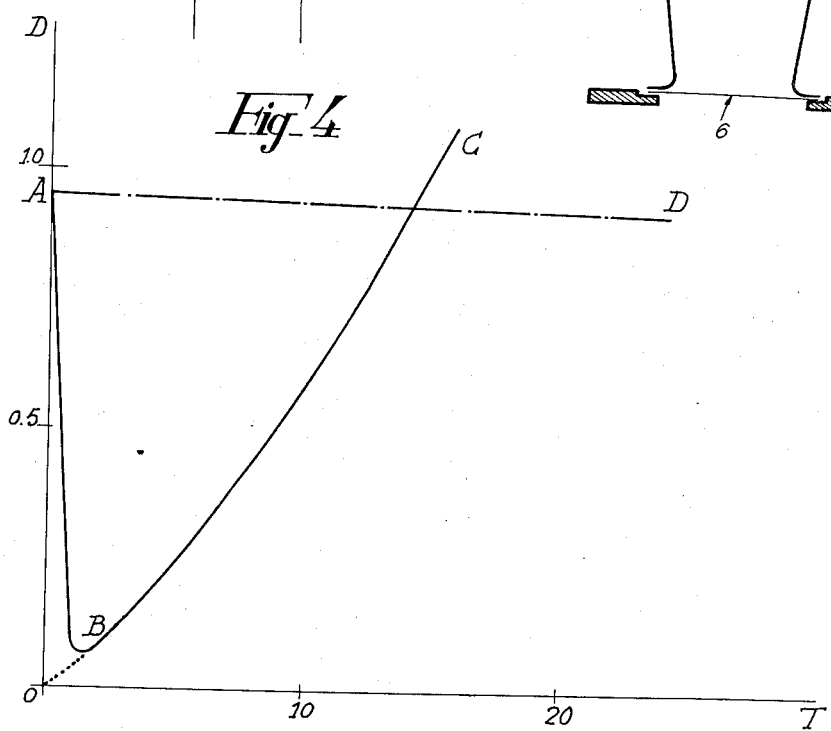

4. After elimination of chlorine, applicant then determined the total oxidizing power of a chlorinated water treated by ultra sounds, that is to say, the oxidizing power corresponding to the amount of chlorine which may possibly be still present and to the oxidizing products generated by the ultra sounds. This was done by taking successive samples of water, the coloration of which with ortho-tolidine was examined with a photometer. Applicant once more obtained confirmation that water, chlorinated at 3 mg. per litre (the normal dose of chlorination of Paris water is 0.1 mg. per litre) rapidly lost its chlorine which was replaced by oxidizing bodies arising from the action of the ultra sounds. This is illustrated by the diagram in Fig. 4, where the abscissae "T" represent the duration of ultra-sounding in minutes and the ordinates the optical densities "D" measuring the oxidizing power. On this diagram, the portion of the curve "AB" corresponds to the disappearance of free chlorine, the curve "BC" to the appearance of oxidizing bodies, the dotted curve "OB" to the effect of ultra sounds on water which had not been previously chlorinated, and the curve "AD" to the natural evolution of superchlorinated water, left to itself.

The various factors which should be taken into consideration in order to obtain the optimum results are discussed below. It follows from applicant's experimental researches that:

1. The optimum range of frequency for the ultra sounds is comprised between 400 and 1000 kc./sec.
2. The energy to be supplied is about 10 watts per square cm. of section of the beam of ultra sounds.
3. The pH of the water should be that of natural water; waters having undergone certain treatments and the pH of which is greater than 8 should be eliminated.
4. The operation should be carried out in the ordinary atmosphere, preferably with circulation of air (light ventilation) or bubbling, so as to renew the gases around the geyser.
5. The operation should be carried out at the surrounding temperature.
6. The treatment should take place at atmospheric pressure. Vacuum and overpressure are not favourable and would make the installation unduly complicated.
7. Mineral salts dissolved in water have no influence on the results. Applicant's experiments were mostly made on a mineralized water (water of the river Moselle, feeding the town of Nancy).
8. The optimum concentration of chlorine in the initial sterilization treatment depends essentially upon the doses to be used for the superchlorination of the water. In general, the proportion of chlorine added to the water to be treated is preferably, according to the invention, of at least 1 mg. per litre and may be as high as to give an initial chlorine concentration in the water from 2 to 3 mg. per litre. To each dose of chlorine corresponds an optimum time of action of the ultra sounds. The chlorination agent recommended for use in association with ultra sounds is gaseous chlorine.

The examples given below illustrate the practical application of the invention.

Example 1

A mains water (Moselle) chlorinated to an initial concentration of 1.5 mg./litre of free $Cl_2$ was treated by ultra sounds at a frequency of 975 kc./sec. with a total supply of energy of 300 watts, that is to say, 10 watts per square cm. of section of the ultra sound beam, a column of water in the ultra-sounding tank of 15 cm. and a time of action of 15 seconds. The residual chlorine concentration was reduced to 0.05 mg./litre, that is, Residual chlorine=3.3% of initial chlorine.
Chlorine eliminated=96.7%.

Example 2

A mains water (Moselle) identical with the above, was subjected to the same conditions of treatment as in Example 1 but the time of action of the ultrasounds was reduced to 10 seconds. The residual chlorine concentration was reduced to 0.07 mg./litre, that is:

Residual chlorine=4.5% of initial chlorine.
Chlorine eliminated=95.0%.

Example 3

A mains water (Moselle) chlorinated to an initial concentration of 0.7 mg./litre of free $Cl_2$ was subjected to the same ultra-sounding conditions as in Example 1, for a time of action of 10 seconds. The residual chlorine concentration was reduced to 0.05 mg./litre.

Instead of being continuous, the treatment can be discontinuous as illustrated by the following example:

Example 4

A mains water chlorinated to an initial concentration of 1.3 mg./litre of free $Cl_2$ is subjected to three ultra-sound impulses of a duration of two seconds each, the characteristics of which are the same as in the previous examples. The total time of action is $2 \times 3 = 6$ seconds. The impulses are separated by a time interval of 3 minutes.

The residual chlorine concentration, 2 minutes after the last impulse, is 0.1 mg./litre.

To sum up, the advantages of the procedure in accordance with the invention are chiefly the following:

1. Superchlorination ensures perfect sterility of the water treated, since the dose of chlorine is equal to about ten times the usual dose.
2. All traces of free chlorine are very quickly eliminated by the ultra sounds treatment.
3. Chlorine is replaced by oxidizing bodies which impart to the water a microbicide power and protect this water thus treated against any possible subsequent contamination.
4. The process can be applied to water which is not rigourously clear.
5. The application of ultra sounds to water does not deprive it of oxygen, breaks down the solid particles in suspension and completes sterilization.
6. Finally, the water which is supplied to the user no longer has any disagreeable taste and does not exert any action on the tar covering of the pipings.

The invention is, of course, not confined to the details of execution described above, which are only given by way of example.

Having now described my invention what I claim as new and desire to secure by Letters Patent is:

1. A water sterilization process which comprises adding to the water to be treated chlorine in the proportion of at least 1 mg. per liter so as to destroy most of the germs existing in water, and then submitting the chlorinated water to ultra sounds, for at the same time disintegrating particles of material containing germs to expose same to the chemical action of chlorine, eliminating chlorine in excess, mechanically destroying the remaining germs and imparting to the water an oxidizing character to obviate further contamination.

2. A process as claimed in claim 1 wherein the initial chlorine concentration is from 2 to 3 mg. per litre.

3. A process as in claim 1 wherein the ultra sounds applied have a frequency of from 400 to 1000 kc./sec. with an energy of about 10 watts per sq. cm. section of the ultra sound beam.

4. A process as in claim 1 wherein the water treated has a pH of less than 8.

5. A process as in claim 1 wherein the ultra sounds are applied with circulation of air.

6. A process as claimed in claim 5, wherein air is bubbled through the bulk of water.

7. A water sterilization process which comprises adding to water gaseous chlorine until the initial content of water is 1.5 mg./litre of chlorine, and subjecting the chlorinated water to ultra sounds for about 15 seconds until the residual content of chlorine is 0.05 mg./litre.

8. A water sterilization process which comprises adding to water gaseous chlorine until the initial content of water is 3 mg./litre of chlorine and subjecting the chlorinated water to ultra sounds for one minute until the residual content of chlorine is 0.1 mg./litre.

9. A process as in claim 1 wherein the chlorinated water is subjected to repeated treatments by ultra sounds with intermediate periods of rest of about 3 minutes.

10. A process as in claim 1 wherein water undergoing treatment contains salts of carbonic acid which neutralize the acidity developed by the ultra sound treatment.

References Cited in the file of this patent

UNITED STATES PATENTS

| | | |
|---|---|---|
| 2,163,649 | Weaver | June 27, 1939 |
| 2,272,223 | Pietzsch | Feb. 10, 1942 |
| 2,417,722 | Wolff | Mar. 18, 1947 |
| 2,452,928 | Hampel | Nov. 2, 1948 |
| 2,500,008 | Richardson | Mar. 7, 1950 |

FOREIGN PATENTS

| | | |
|---|---|---|
| 500,271 | Great Britain | Apr. 29, 1937 |

OTHER REFERENCES

Manufacturing Chemist and Manufacturing Perfumer, Nov. 1948, pages 505 and 506.